March 13, 1962 F. R. JACKSON, JR 3,025,469
PHANTASTRON CIRCUIT WITH OUTPUT WAVEFORM LINEARIZATION MEANS
Filed June 10, 1958
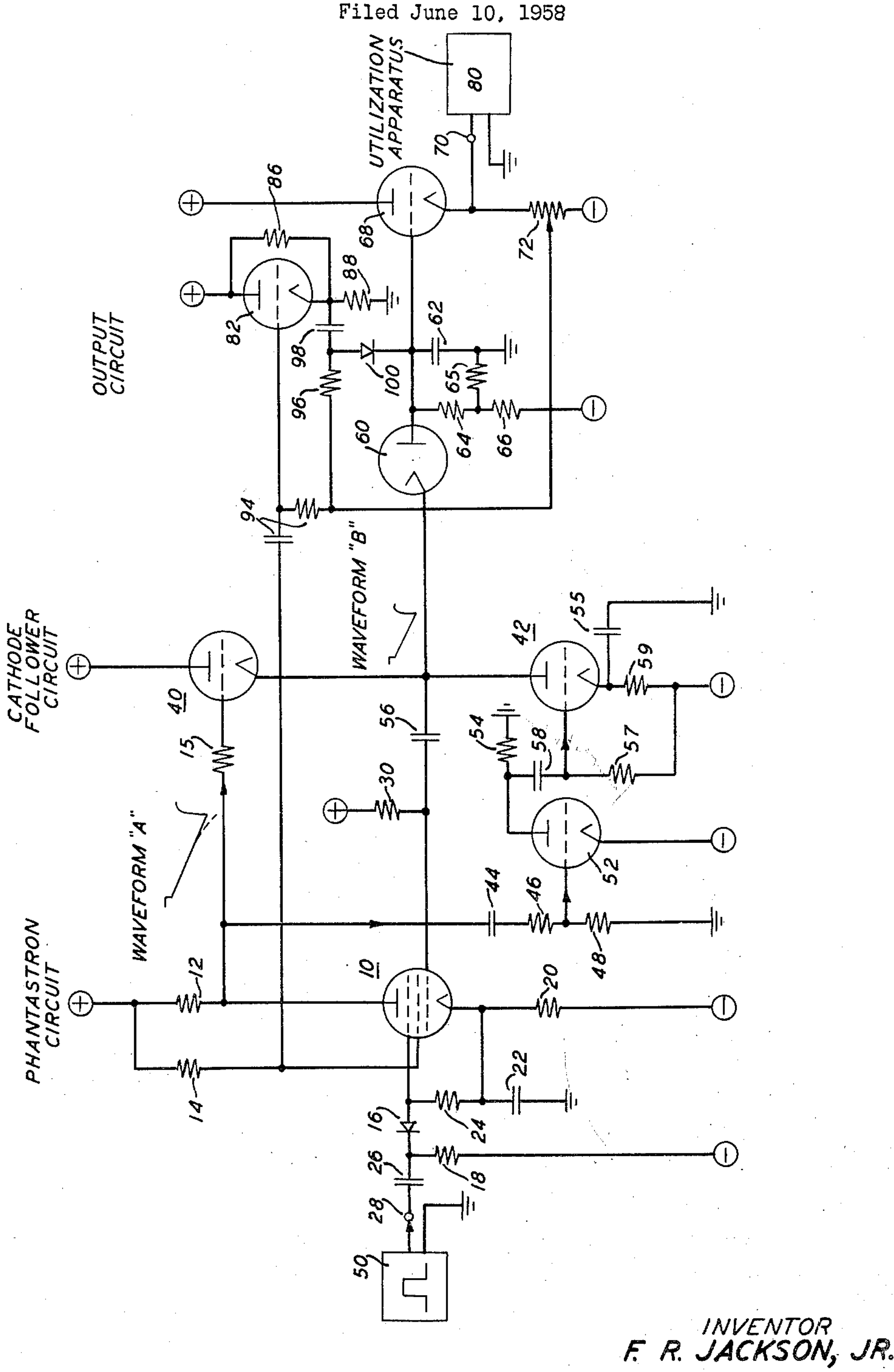
INVENTOR
F. R. JACKSON, JR.
BY Walter M. Hill
ATTORNEY 3,025,469
Patented Mar. 13, 1962

3,025,469

PHANTASTRON CIRCUIT WITH OUTPUT WAVEFORM LINEARIZATION MEANS

Frederick R. Jackson, Jr., Mountain Lakes, N.J., assignor to Bell Telephone Laboratories, Incorporated, New York, N.Y., a corporation of New York
Filed June 10, 1958, Ser. No. 741,198
10 Claims. (Cl. 328—112)

This invention relates to waveform transformation circuits and more particularly, in an important aspect, to a phantastron circuit for establishing an output signal proportioned in amplitude to the time duration of an input pulse signal.

In the prior art there have become established a great many well-known circuits for deriving an output signal proportioned to the time duration of an input signal. Such circuits have found widespread employment in sweep circuits, indicating equipment, and the like. Most particularly, such circuits have proven indispensable in the exactingly accurate field of military electronics.

Advantageously, for example, the phantastron circuit such as that typified by the circuit shown in B. L. Cordry Patent 2,824,960, granted February 25, 1958, has been so employed. Toward improving the slope linearity of the output signals generated by such phantastron circuits, it has been known to be of advantage to employ a familiar cathode-follower output stage.

Such a cathode-follower output stage, as is well known in the art, provides a high input impedance and a low output impedance. Thus, the cathode follower effectively isolates the phantastron circuitry from the disturbing influences of utilization circuitry.

Despite the advantageous isolation provided by the cathode follower, phantastron circuits known in the prior art have, nonetheless, fallen short of perfection in the complete linearity of their output signals. Further, the cathode follower has itself proven an undesirable element in many circuit applications where power requirements must be minimized for purposes of economy and for limiting both heat dissipation and equipment weight.

It is accordingly an object of the present invention to improve the linearity of a wave transformation circuit and at the same time to reduce the power requirements of such a circuit.

This and other objects are achieved in accordance with the present invention by the provision of a signal controlled, variable cathode impedance element for a cathode follower output stage which is associated with a wave transforming circuit. A gating circuit is further provided for switching this variable impedance element to a low impedance condition only upon the occurrence of desired output signals. Further, properly proportioned linear networks are provided for controlling the impedance of this element to correct any tendencies of the wave transforming circuit to depart from absolute linearity.

By way of example and for purposes of illustration, in a preferred embodiment of the invention there is provided a wave transforming phantastron circuit constructed around a pentode vacuum tube. The screen and plate electrodes of this tube are connected through respective resistors to a common power supply. An input terminal is capacitively coupled to the suppressor grid electrode which is normally biased Off by an appropriate potential source. The plate electrode is resistively coupled to the control grid of a cathode-follower-connected triode vacuum tube and, as well, is coupled through a resistor-capacitor circuit to the control grid of a normally conducting triode gating tube.

The plate of this gating tube, in turn, is capacitively coupled to the control grid of yet another triode having its cathode-plate conduction path serially connected as a cathode impedance element in the cathode-follower circuit. This latter triode thus constitutes a dynamic or variable cathode impedance element.

The control electrode of the phantastron pentode is returned through a resistor to a positive potential source and is also coupled capacitively to the common point between the cathode-follower triode and the dynamic cathode impedance element. This common point in turn is coupled through an asymmetrically conducting charging device such as a diode to control the charge on an output capacitor.

Upon application of a positive input signal, the familiar phantastron linear decay signal appearing at the plate electrode of the pentode tends to reduce the conductivity of the gating triode and thus to increase the conductivity of the triode which constitutes the dynamic cathode impedance element. This increased conductivity provides a path of lowered resistance for altering the charge on the output capacitor. At the same time, by a proper proportioning of the resistive-capacitive coupling network from the pentode plate electrode to the control grid of the gating triode, any departures from linearity of the pentode plate electrode decay signal act to reduce the dynamic cathode impedance. Consequently, any tendency toward such departures serves to correct the linearity in the signal appearing at the output capacitor. Concomitant with this desirable increase in linearity, total power dissipation in the cathode follower is reduced substantially by virtue of the high impedance of the dynamic cathode impedance element in the absence of the phantastron decaying output signal and the low impedance of this element during such a signal.

The invention will be fully apprehended and other objects, features and advantages thereof will become apparent from a consideration of the following detailed description of an illustrative embodiment of the invention taken together with the drawing.

The drawing is a partial schematic diagram of a pulse length to voltage converter employing circuits embodying principles of the invention.

Referring more particularly to the drawing there is shown a Phantastron Circuit such as is well known in the art.

This phantastron circuit comprises a pentode vacuum tube 10 having its plate and screen grids respectively connected through two resistors, 12 and 14, to a positive potential source indicated but not shown specifically. The suppressor grid is normally biased Off by a negative potential source, indicated but not specifically shown. This source acts through an asymmetrically conducting device, here the rectifying diode 16, and a biasing resistor 18. Another biasing resistor 20 connects the cathode electrode to a source of negative biasing potential, indicated but not shown, and an isolating capacitor 22 stabilizes the voltage of that cathode with respect to ground. Yet another biasing resistor 24, connected between suppressor and cathode, isolates the cathode from the Off biasing potential applied to that suppressor. A coupling capacitor 26 is connected between the suppressor grid and an input point 28 to which input pulse signals of positive polarity may be applied from a source 50 which may be any one of many well known pulse sources.

The illustrative apparatus of this invention is adapted to generate an output signal of an amplitude proportional to the duration of these input pulse signals from the source 50. Therefore, the values of the coupling capacitor 26 and associated isolating resistor 18 are so chosen as to provide a time constant which is long compared to the maximum anticipated duration of the input pulse signal. A positive potential source, indicated but not shown, provides a positive bias for the control grid of the pentode vacuum tube through resistor 30 as indicated.

The pentode plate electrode is coupled through a damping resistor 15, an "anti-sing" resistor as it is known colloquially, to the control grid of a triode vacuum tube 40 in the Cathode Follower Circuit. This triode vacuum tube is connected in the well-known cathode-follower configuration and employs the cathode-to-plate conduction path of yet another triode vacuum tube 42 as a cathode impedance element.

The pentode plate electrode is further coupled through a serially connected capacitor 44 and two resistors 46 and 48, to ground. From the common connection point of these two resistors the pentode plate electrode is coupled to the control grid of a normally conducting gating triode 52. The total resistance value of the two resistors 46 and 48 is proportioned to the capacitance of capacitor 44 in accordance with well-known theory so that the current in the resistors remains substantially constant as the pentode plate follows the linear portion of waveform "A" and that departures of the pentode plate potential from its designed linear decay path couples a corrective signal to the control electrode of triode 52. The plate electrode of this gating triode is coupled through a resistor 54 to ground and the cathode electrode is connected directly to a negative potential source indicated but not shown. This gating triode is rendered normally conducting by virtue of the positive bias applied to its control electrode by the ground connection through resistor 48 in view of the negative connection of the cathode electrode.

A coupling capacitor 56 is connected between the cathode electrode of the cathode-follower-connected triode 40 and the control grid electrode for performing the feedback functions well known in the phantastron art.

These above-described circuits constitute a basic phantastron circuit as modified in accordance with the principles of the invention. Without application of an input signal the pentode cathode-plate circuit is nonconducting by virtue of the negative bias applied to the suppressor grid. The control grid conducts heavily by virtue of the positive potential source connected thereto through the current limiting resistor 30. The screen grid similarly conducts heavily and rests at a potential substantially below that of the positive bias source through which this screen grid is supplied by way of the resistor 14.

Upon application of a positive input pulse the suppressor grid is driven from its negative cutoff potential level and plate current begins to flow. There results a small but sharp drop in the plate voltage as shown in the plate waveform "A." Thereafter this pentode plate voltage decays downwardly with substantial linearity as is shown and as is well known in the art. The behavior of an illustrative circuit of this type is discussed, for example, by D. Sayre in Waveforms, vol. 19, M.I.T. Radiation Laboratory Series, McGraw-Hill Book Company, Inc., New York, 1949, at pages 195–199.

As the pentode plate voltage drops, this signal is coupled to the gating triode control grid. Hence, this gating tube is rendered less conductive and a rise in its plate potential is applied through a large coupling capacitor 58 to the control grid of the cathode impedance triode 42.

A large resistor 57 connects this control grid to a source of negative biasing potential, indicated but not shown specifically, and another resistor 59 performs a similar function for the cathode electrode of this same cathode impedance triode 42. A capacitor 55 connects this cathode to ground to stabilize potentials developed at the cathode electrode. Thus the dynamic cathode impedance triode is normally conducting at a very low level since any cathode-plate current is severely limited by the resistor 59. As the positive going signal is coupled from the plate of gating triode 52 through the long time constant arrangement of resistor 57 and capacitor 58, however, it tends to overcome the current limiting effect of the cathode resistor 59. Hence, the current conducted by the cathode impedance triode increases under the influence of negative going signals coupled from the plate electrode of the pentode 10.

The signal appearing at the plate of that pentode 10, as illustrated by waveform "A," is applied to the control grid of the cathode-follower triode 40 as noted heretofore. The cathode impedance element, triode 42, for that triode 40 now being enabled by the same pentode plate signal, an approximate replica of that waveform "A" appears at the cathode electrode of triode 40. This replica waveform is illustrated in the drawing as waveform "B."

This signal having the replica waveform is applied to an Output Circuit. Here it may pass through the cathode-plate path of an asymmetrically conducting device, diode 60, to adjust the charge of an output capacitor 62 which has one terminal connected to ground potential. The other terminal of this output capacitor is connected both to the diode plate electrode and, through a resistance network comprising two serially connected high impedance resistors 64 and 66, to a source of negative biasing potential, indicated but not shown. The common terminal of the resistors 64 and 66 is returned through a relatively low resistance value resistor 65 to ground potential.

Thus, whatever the polarity of charge on the output capacitor 62, the potential of the ungrounded terminal of this capacitor tends to decay slowly toward a level slightly below ground potential through the high resistance path of the resistors 64 and 65. This level is dictated by the large resistance value of resistor 66 compared with that of resistor 65.

The ungrounded terminal of the output capacitor 62 and the plate electrode of the diode 60 are connected in common to the control grid of an output triode 68. This triode has its plate electrode connected to a source of positive potential, indicated but not shown, and its cathode connected both to an output point 70 and, through a tapped resistor 72, to a source of negative potential, indicated but not specifically shown. This output triode 68, with the above-described connections, constitutes a well-known cathode-follower stage for coupling the voltage which is common to the plate electrode of diode 60 and to the ungrounded terminal of the capacitor 62 through an output point 70 to a utilization circuit 80. This utilization circuit may, for example, be any one of many such known in the computer art for utilizing an analog voltage representation of the time duration of an input pulse signal.

With so much of the output circuit understood, the advantageous cooperation of the old phantastron circuits with the structures following the principles of the invention may become more clear.

Assume the capacitor 62 to have an illustrative charge of +40 volts on its ungrounded terminal and illustrative positive potentials of +150 volts to be supplied by the positive potential sources indicated. As a positive pulse is supplied from the source 50, the potential level of the pentode plate electrode decays from a value of +150 volts so long as the input pulse maintains its positive value.

Assuming desired linearity of the plate voltage decay, this potential falls to the level of the ungrounded terminal of the capacitor 62 in a time which is measured by that ungrounded terminal potential level. Further assuming the input pulse to persist beyond this time, the cathode of diode 60 now falls below the plate potential of this same diode. Hence, the capacitor 62 shifts from its high impedance discharge path through the resistors 64 and 65 to discharge through the diode 60 and the triode 42. Thus the voltage on this capacitor follows the decaying pentode plate potential with facility. The linearity of this pentode decay accordingly determines the accuracy with which the potential level of the capacitor 62 indicates the duration of the input pulse.

At the instant the pentode plate potential begins to fall, the pentode control grid electrode potential falls slightly below the cathode potential by the feedback action through the loop from the cathode of triode 40 through the capacitor 56. Maintaining this control grid at a potential level to support the plate potential decay, current flows from the positive potential source through resistor 30 to charge the capacitor 56.

As the pentode plate potential falls to a level at which the diode 60 conducts, the charging current to the capacitor 56 continues substantially unchanged. The output capacitor 62, however, is now connected to the cathode electrode of the triode 40 through the diode 60. Hence, this output capacitor tends to hold that cathode and, with it, one terminal of the capacitor 56 at a fixed rather than decaying potential level. The charging current flowing through resistor 30 accordingly tends to raise the potential level of the pentode control grid.

Such an increase in control grid potential level would be subject to the pentode amplification factor $\mu$ and tend toward a regenerative departure of the pentode plate potential from the desired linear decay characteristic. This putative departure from linearity is indicated by the dashed curve of waveform "A."

The circuits in accordance with the invention preclude such a departure. Any tendency of the pentode plate electrode to depart from the desired linear decay path is coupled through the series capacitor-resistor arrangement 44, 46 to increase the conductivity of the dynamic cathode impedance element triode 42. Thus, the impedance is reduced in the discharge path of the capacitor 62 comprising the diode 60 and the triode 42. Hence, the output capacitor 62 is enabled to discharge smoothly following the linear decay pattern of the pentode plate potential as reflected in the waveform "B."

At the same time, the potential of the pentode control grid is maintained at a level to correct for any departures of the pentode waveform from true linearity with a correction-to-error ratio corresponding to the known high amplification factor of the pentode vacuum tube. Thus, by practice of the invention, the linearity of the pentode plate voltage decay is substantially improved indicated by comparison of the dashed and solid portions of waveform "A." Further, the output signal derived from this pentode plate decay signal, as indicated by the waveform "B," is further improved by a decrease in the resistance of the dynamic cathode resistor triode 42. Concurrently with this improved output waveform, reduction of the impedance value of the cathode resistor during the period of high current conduction leads to a major improvement in overall power dissipation. This improvement is of the order of 15 to 1 in comparison with a similar circuit employing a fixed cathode resistor.

An important function ancillary to the optimum operation of the Output Circuit is the reset function accomplished by a cathode-follower-connected triode 82. It is advantageous in many employments of converters such as shown in the drawing that their designed time range of conversion be represented by a fixed voltage range between similar output voltage amplitudes of opposite polarity. Thus, in the absence of input pulses, it has been seen that the voltage appearing at the ungrounded terminal of output capacitor 62 decays to a fixed potential approximating zero. This decay through resistors 64, 65, 66 makes it desirable to maintain the potential level of this output capacitor, even during interpulse intervals, at a value approximating the voltage level which indicates the pulse duration of successive pulses to be measured. This desirable objective is achieved by the reset circuitry.

The plate electrode of the reset triode 82 is connected to a source of positive potential, indicated but not shown specifically. A pair of serially connected resistors 86, 88 interconnect this potential source with ground potential.

A connection from the cathode electrode of triode 82 to the common connection point of these two resistors 86, 88 enables these resistors to perform a joint voltage divider function and the ground connected one of them, resistor 88, to act as a cathode resistor in the cathode-follower circuit of triode 82. For voltage divider purpose resistors 86 and 88 are proportioned to bias the cathode of triode 82 at a level corresponding to the upper output voltage level of the range noted above.

As the pentode plate electrode begins to conduct current, the screen electrode current falls off and a positive signal appears at this screen electrode. This signal is coupled through a capacitor-resistor input network 94 to the control grid of reset triode 82. This network 94 has a time constant less than the time required for the pentode plate potential to decay from its upper potential level to the upper level of the voltage range within which the converter output signals are to fall.

The control grid and cathode of the triode 82 are interconnected through the serially connected resistor of the input network 94, another high impedance resistor 96, and an isolating capacitor 98. From a point between this high impedance resistor 96 and isolating capacitor a rectifying diode is connected to the ungrounded terminal of output capacitor 62 with a polarity to conduct positive signals in a low resistance direction from the reset cathode to this output capacitor 62. Reverse biasing potential is supplied to this latter diode through high impedance resistor 96 from the tap on output cathode resistor 72. Thus the reset triode 82 is normally isolated from the output capacitor 62 by the reverse biasing of diode 100 as well as by the negative potential applied to its control grid. Both these isolating functions are accomplished by the negative biasing potential applied to output cathode resistor 72 from the source indicated but not shown. Since the grid biasing potential is derived from a tap on the output cathode resistor, this potential is proportioned to the voltage on the output capacitor. Hence, output energy supplied by this reset triode is similarly proportioned to the existing output capacitor charge.

Upon application of a positive pulse from the pentode screen grid to the reset triode control grid, energy is coupled from the reset triode cathode through the diode 100 to the output capacitor. The amount of this energy so coupled is controlled by the potential of that output capacitor as noted above and the upper voltage range level established by the proportioning of voltage divider resistors 86 and 88. Thus, the potential level of the output capacitor is adjusted to account for leakage following the next preceding pulse. Since the time constant of the input network 94 is adjusted as discussed heretofore, this entire adjustment is accomplished in the interval during which the pentode plate signal is decaying toward the output capacitor voltage. Hence, the diode 60 is nonconducting and voltage adjustments in the output capacitor have no effect on the linear decay of that pentode plate signal.

Thus, the illustrative structure embodying principles of the invention provides a relatively steady output voltage indicating the pulse duration of successive input signals from the source 50. Instantaneous and precise measurement of any particular pulse duration beyond that indicated by the residual output capacitor charge is accomplished by the low impedance discharge of this output capacitor under the accurately linear timing control of the pentode plate decay signal. Pulse durations of shorter length than indicated by the residual output capacitor charge are similarly measured with facility by virtue of the resetting circuitry which provides resetting energy in proportion to the amount that such energy is required at a time prior to the termination of the pulse for the measurement of which the reset energy is required.

It will be apparent to those skilled in the art that the pulse length to voltage converter described is illustrative only of the many and varied embodiments of the invention in which the reduced power requirements and accurately linear time measurement that characterize the invention may be found to advantage. For example, in the illustrative embodiment described signal translating elements have in the main been limited to vacuum tubes. Such vacuum tubes may well be replaced by transistors or other equivalent translating elements without departing from the spirit and scope of the invention. Similarly the phantastron circuit described may be replaced by other wave transformation circuits for generating time varying signals which may decay either from a high to a low level or from a low to a high level.

What is claimed is:

1. In apparatus for generating an output signal proportioned to the duration of an input signal, the combination which comprises a wave transformation circuit for generating a time varying intermediate signal from said input signal, a circuit comprising a cathode follower having a signal controlled variable cathode impedance element, coupling means for applying said intermediate signal to the input of said cathode follower, a second coupling means for applying said intermediate signal to said cathode impedance element for varying the impedance of said element in response to said intermediate signal, and signal storage means connected in circuit across said variable impedance for storing output signals derived from said variable impedance.

2. In apparatus for deriving an output signal proportioned to the duration of an input signal from a source, the combination which comprises means connected in circuit with said source for deriving an intermediate signal having an amplitude and duration substantially related to the continuance of said input signal, a cathode follower circuit connected for receiving said intermediate signal and comprising a signal controlled, variable cathode impedance element having a normal high impedance condition, signal coupling means for coupling said intermediate signal to said variable impedance element, said coupling means being proportioned to vary the impedance of said cathode impedance element in relation to the rate of change of said intermediate signal, and utilization means connected in circuit with said variable cathode impedance element for utilizing signals appearing thereacross.

3. Apparatus as set forth in claim 2 wherein said signal coupling means comprises a signal controled gating element.

4. Apparatus as set forth in claim 2 wherein said signal coupling means comprises a resistive element and a reactive element in serial connection.

5. In apparatus for generating an output signal porportioned to the duration of an input signal from a source, the combination which comprises a phantastron circuit responsive to input signals applied thereto for generating a substantially linear decay signal, means for applying said input signal to said phantastron circuit, a circuit comprising an amplifying element and a signal controlled variable impedance element connected to the output of said amplifying element, means for applying said decay signal for amplification to said amplifying element, coupling means for applying said decay signal to control the impedance of said variable impedance element for controlling its variation, and utilization means connected in circuit with said variable cathode impedance for utilizing signals appearing thereacross.

6. In a phantastron circuit of the type utilizing a cathode follower output stage, the combination comprising a cathode follower having a signal controlled variable cathode impedance element, coupling means for applying a wave signal generated by said phantastron circuit to said variable cathode impedance element, an asymmetrically conducting device and a signal storage element serially connected across said cathode impedance element, said asymmetrically conducting device having a high impedance for signals of one polarity and a low impedance for signals of the opposite polarity, and means for establishing a biasing potential across said storage element in a direction to bias said asymmetrically conducting device in a high impedance direction, said biasing means having a potential level intermediate excursions of signals appearing across said cathode impedance element.

7. In a phantastron circuit of the type utilizing a cathode follower output stage the combination comprising a signal controlled variable cathode impedance element connected to the cathode follower in said output stage, coupling means for applying a wave signal generated by said phantastron circuit to said variable cathode impedance element, an asymmetrically conducting device and a signal storage element serially connected across said variable impedance element, said device having a high impedance for signals of one polarity and a low impedance for signals of an opposite polarity, high impedance means for establishing a biasing potential across said storage element in a direction to bias said two state impedance device in a high resistance direction, said biasing means having a potential level intermediate excursions of signals appearing across said cathode impedance element, signal responsive means for applying energy to said storage element and a second coupling means for applying an actuating signal to said signal responsive means upon initiation of wave signal generation by said phantastron circuit.

8. Apparatus as set forth in claim 7 wherein said second coupling means comprises means for limiting the time duration of actuating signals to an interval wherein said asymmetrically conducting device is biased in a high impedance condition.

9. Apparatus as set forth in claim 7 and in combination therewith means for varying the energy applied to said storage element in proportion to the potential level in said storage element.

10. In apparatus for generating an output signal proportioned in amplitude to the duration of an input signal from a source, the combination which comprises a phantastron circuit responsive to input signals applied thereto for generating a substantially linear decay signal, means for applying said input signal to said phantastron circuit, a circuit comprising an electron tube having a plate, a control grid and a cathode and a variable impedance element connected to said cathode, means for applying said decay signal for amplification to said control grid, means coupled between the output of said phantastron circuit and said impedance element, said last-named means being for controlling the impedance of said impedance element responsive to departures of said decay signal from linearity, and utilization means connected in circuit with said impedance element for utilizing signals appearing thereacross.

References Cited in the file of this patent

UNITED STATES PATENTS

| | | |
|---|---|---|
| 2,410,920 | Atwood | Nov. 12, 1946 |
| 2,428,926 | Bliss | Oct. 14, 1947 |
| 2,549,875 | Williams et al. | Apr. 24, 1951 |
| 2,554,172 | Custin | May 22, 1951 |
| 2,824,960 | Cordry | Feb. 25, 1958 |
| 2,835,815 | Cones | May 20, 1958 |
| 2,867,721 | Churchill | Jan. 6, 1959 |